Aug. 4, 1942.    S. A. SCHELKUNOFF ET AL    2,292,342
REFLECTING SYSTEM FOR ANTENNAS
Filed Feb. 28, 1940    2 Sheets-Sheet 1
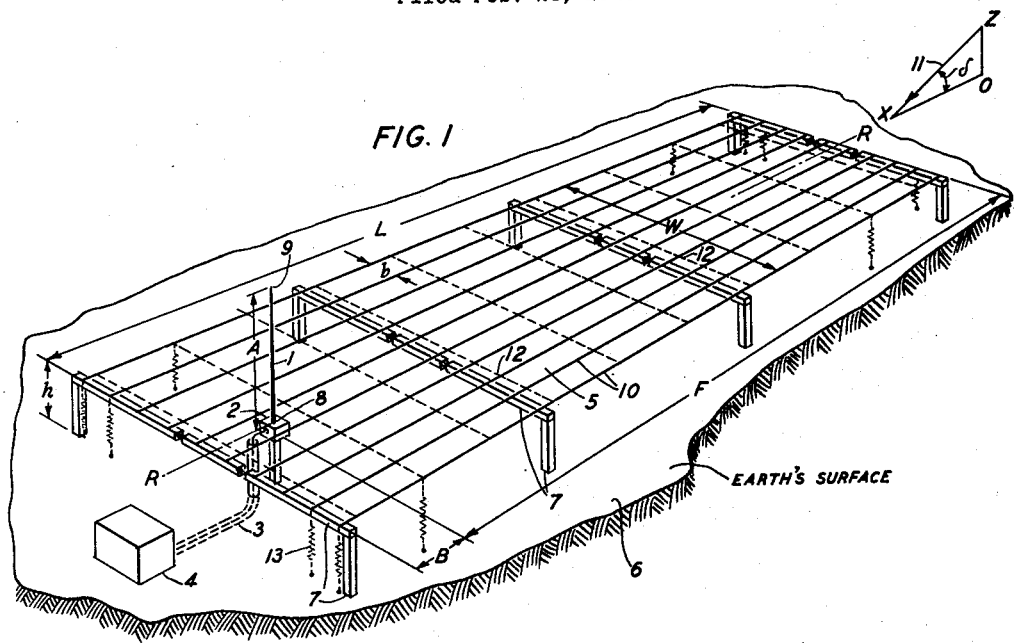
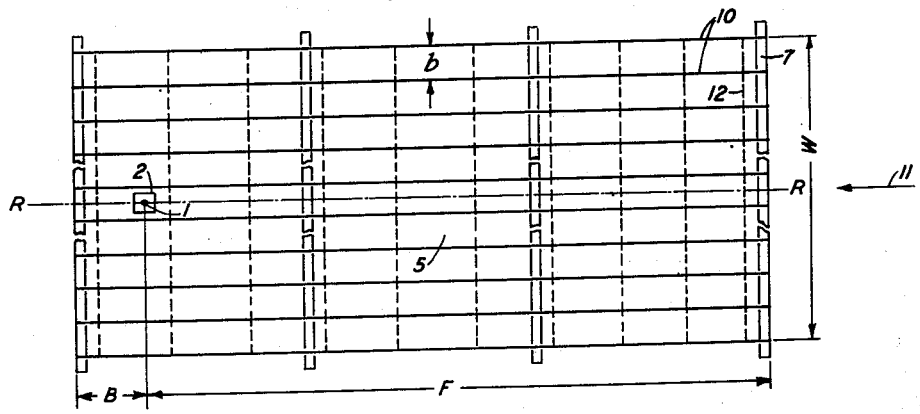
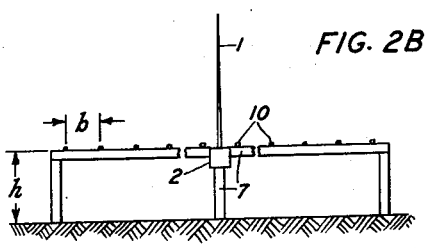
INVENTORS: S. A. SCHELKUNOFF
W. M. SHARPLESS
BY A. J. Zerbarini
ATTORNEY Aug. 4, 1942.   S. A. SCHELKUNOFF ET AL   2,292,342
REFLECTING SYSTEM FOR ANTENNAS
Filed Feb. 28, 1940      2 Sheets-Sheet 2
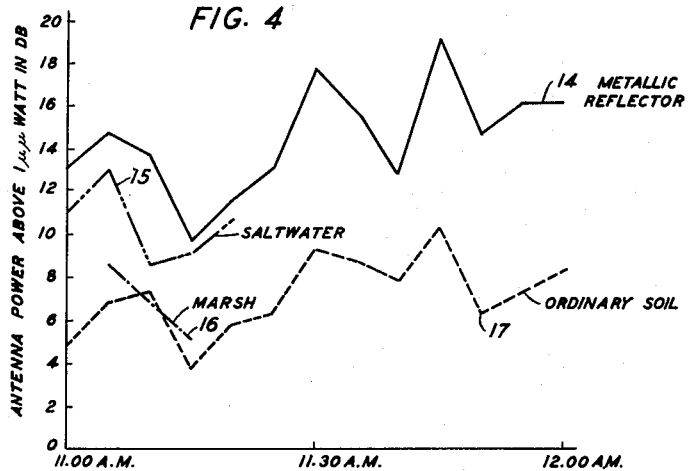
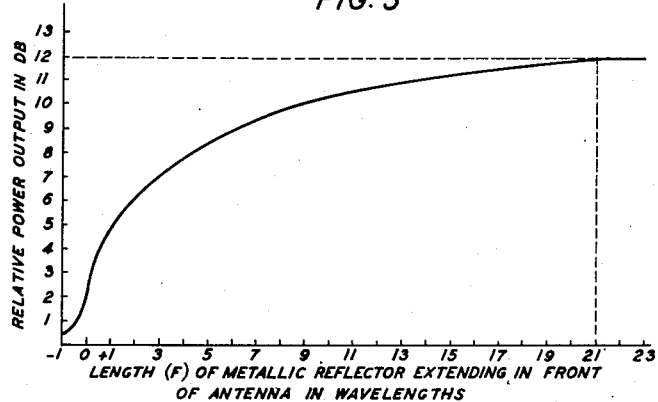
INVENTORS: S. A. SCHELKUNOFF
W. M. SHARPLESS
BY A. J. Zerbarini
ATTORNEY Patented Aug. 4, 1942

2,292,342

UNITED STATES PATENT OFFICE 2,292,342

REFLECTING SYSTEM FOR ANTENNAS

Sergei A. Schelkunoff, New York, N. Y., and William M. Sharpless, Fair Haven, N. J., assignors to Bell Telephone Laboratories, Incorporated, New York, N. Y., a corporation of New York Application February 28, 1940, Serial No. 321,158

9 Claims. (Cl. 250—11)

This invention relates to a reflector system for use with an antenna system and more particularly to a reflector for improving radiant action at relatively low vertical or incident plane angles.

As is known, and as is described in detail in the paper "Optical Behavior of the Ground for Short Radio Waves" by C. B. Feldman, published in the Proceedings of the Institute of Radio Engineers, June 1933, transmission and reception of horizontally polarized waves at the surface of the ground is substantially annulled by reason of the so-called ground reflection phenomenon. In the case of reception of waves polarized in the vertical plane of incidence, mutual cancelation of the wave component propagated directly to the receiving antenna and of the component arriving via reflection from the ground surface occurs for waves incoming at vertical plane angles smaller or lower than the so-called pseudo-Brewster angle, and for angles larger or higher than the aforementioned critical angle the components add in phase. The pseudo-Brewster angle may be defined as the angle in the vertical plane formed by the horizontal ground reflecting surface and the wave direction at which the wave undergoes a 90-degree phase shift upon reflection at the ground surface and its value is related to the conductivity of the ground in the immediate vicinity of the antenna. In general, the higher the degree of conductivity, the smaller the value of the angle, and for the ideal perfect ground the angle is zero. Since, in long range communication the incoming wave is often polarized in the incident or vertical plane and intercepts the receiving antenna of a ground station at an angle below the pseudo-Brewster angle, although as emitted at the distant transmitting station it may have been horizontally polarized, it appears desirable to lower this critical angle in the incident plane of desired wave propagation for the purpose of improving reception of low angle wave components polarized in the incident plane. Considered from another standpoint, the efficiency of low angle transmission or reception may be greatly increased by rendering, for certain low angle waves, the reflected component and the directly propagated component in phase and, for certain extremely low angles, by minimizing the effect of the reflected component.

It is one object of this invention to improve directive radio communication.

It is another object of this invention to lower, at a given transmitting or receiving station, the pseudo-Brewster angle in a desired incident plane of propagation.

It is still another object of this invention to compensate for the imperfect conductivity and imperfect reflective quality of the earth's surface in the vicinity of an antenna.

It is a further object of this invention to secure an inexpensive artificial antenna ground system having conductive and reflective properties exceeding, or at least comparable to, those of a salt-water site, the optimum reflecting surface of the earth, and having a more desirable directive characteristic than the above-mentioned natural reflection surface.

The above and other objects of the invention are obtained by including between a vertical transmitting or receiving antenna system and the earth's surface a horizontal metallic reflector or screen comprising a plurality of parallel conductors extending in the general direction of the desired wave propagation. Generally considered, the directional, reflecting and screening properties of the system and its effectiveness are functions of the direction, length, breadth, spacing, resistance and number of conductors utilized and the elevation of the reflector above the ground. More particularly, the spacing between conductors and the reflector height above ground are related to the wave-length utilized and to the mean incident angle of radiant action, the spacing between adjacent conductors being about $\frac{1}{45}$ of a wave-length and the height or elevation at least as great as the conductor spacing. The length of the portion of the reflector extending in front of the antenna, that is, toward the cooperating station, is related to, and preferably is greater than ten times the antenna height; and the reflector width, while variable over a great range, is preferably four times the antenna height. If desired, means may be associated with the reflector for eliminating reflection losses and standing waves.

The auxiliary antenna ground structure described above is of high conductivity and functions to suppress and practically eliminate the disturbing effects of reflection from ordinary ground for low angle vertically polarized waves. It functions as a solid or continuous conducting surface to reflect incident waves having certain incoming angles and by virtue of its highly conductive properties to lower considerably the pseudo-Brewster angle. In this respect the structure simulates the optimum natural earth reflecting surface. It also functions to screen the underlying earth from extremely low incident waves whereby, by eliminating or greatly weakening the reflected wave, the direct or incident wave is not impaired. In contrast to the salt-water site referred to above, applicants' structure is highly directive. Thus, it favors reception of transmission at low angles in the plane containing the longitudinal axis of the antenna and, at the same time, permits destructive interference between direct and reflected components for waves having other azimuthal directions. Hence, the directivity of the entire system, including the antenna, is greatly improved.

The invention will be more fully understood from a perusal of the following specification taken in conjunction with the drawings on which like reference characters denote elements of similar function and on which:

Fig. 1 is a perspective view of one embodiment of the invention;

Figs. 2A and 2B are respectively top and elevational views of the embodiment of Fig. 1; and Figs. 3 and 4 are curves plotted from test data and showing the advantages secured by the invention.

Referring to Figs. 1, 2A and 2B, reference numeral 1 denotes a vertical antenna connected through a tuning or coupling device 2 and a line 3 to a translation device 4 which may be a transmitter or a receiver. Reference numeral 5 designates a conductive reflecting system positioned parallel to the earth's surface 6. The device 2 and reflector 5 are supported at a height $h$ above the surface 6 by the wooden members 7. Preferably the entire antenna 1 is positioned above, and the device 2 and line 3 below, the system 5, the bottom antenna extremity 8 being included in the plane of the reflecting system 5. The height above the surface 6 of the apex or top extremity 9 of antenna 1 is denoted by reference character A. The reflecting system 5 extends a considerable distance F in front, a small distance B in back, and a distance S preferably equal to twice the antenna height A on each side of the antenna. It comprises a large number of conductors 10 which are parallel to each other and to the desired incident or vertical plane XOZ of wave propagation. The spacing between adjacent conductors 10 is less than .033 wave-length, and it is related to the wave-length and the mean arrival angle of the incoming wave. For a reflecting system composed of perfectly conducting wires and positioned in free space, the relation of the spacing, the wave-length and the wave-arrival angle may be obtained from the equations given below, each of which represents the ratio between the total field and the incident field sufficiently below the reflecting system to eliminate the distortion caused by an uneven distribution of current over the entire surface of the reflecting system, the current being established on the wires and not in the spaces between the wires.

$$\frac{E_i}{E_t} = \frac{\lambda}{(2b)(\sin \delta)\left(\log_e \frac{b}{a} - \frac{11}{6}\right)} \quad (1)$$

$$20 \log_{10}\left|\frac{E_i}{E_t}\right| = 20 \log_{10}\frac{\lambda}{b} - 6 - 20 \log_{10}\left[\log_e \frac{b}{a} - \frac{11}{6}\right] \quad (2)$$

$-20 \log_{10} \sin \delta$, in decibels where $E_i$ = incident field
$E_t$ = total field
$a$ = radius of wires in meters
$b$ = distance between wires in meters
$\lambda$ = wave-length in meters
$\delta$ = angle in incident plane between plane of reflector wires and path of the incoming signal.

For a system having a height $h$ above earth ground and comprising wires each having an internal impedance $Z_i$ per unit length, the ratio of incident field and total field may be determined as follows:

The transmission coefficients $p_1$ and $p_2$ across an artificial ground consisting of, respectively, perfectly conducting wires and wires having unit internal impedance $Z_i$ are $$p_1 = \sqrt{-1}\frac{2b}{\lambda}\left(\log \frac{b}{a} - \frac{11}{6}\right) \sin \delta \quad (3)$$

$$p_2 = \frac{p_1 + \frac{bZ_i}{60\pi \sin \delta}}{1 + p_1 + \frac{bZ_i}{60\pi \sin \delta}} \quad (4)$$

where $\sqrt{-1}$ represents 90-degree phase difference between the transmitted and the incident fields.

The reflection coefficients, $q_1$ and $q_2$ for artificial ground located, respectively, in free space and above an earth ground are $$q_1 = \frac{1}{1 + p_1 + \frac{bZ_i}{60\pi \sin \delta}} \quad (5)$$

$$q_2 = q_1 - \frac{p_2^2}{1 + q_1} \quad (6)$$

for low incident angles. Hence, $$\frac{V_i}{E_i} = \frac{1}{1+q_2} = \frac{4q_1}{1+q_1}$$

For a perfect ground $1+q_2=2$ and the deficiency of the artificial ground as compared to perfect ground may be expressed as, $$20 \log_{10}\frac{2}{1+q_2} = 20 \log_{10} \tfrac{1}{2}\left(1 + \frac{1}{q_1}\right)$$

$$= 20 \log_{10}\left[1 + \frac{bZ_i}{377 \sin \delta} + \tfrac{1}{2}p_1\right] \quad (7)$$

In practice the effect of the earth reflecting surface must be considered inasmuch as there exists in the space surrounding the reflecting system a strong reactive field representing the distortion of the incident field produced by the wires 10. The approximate ratio of the maximum amplitude, $H_r$, of this reactive field to the average amplitude, $H_a$, of the field immediately above the reflecting system is given by the following equation:

$$\frac{H_r}{H_a} = \frac{1}{\frac{e^{\pi h}}{b} - 1} \quad (8)$$

where $e = 2.718$
$h$ = distance between reflecting system and earth's surface
$b$ = wire spacing If $$h = b, \frac{H_r}{H_a} = .045 \quad (9)$$

and if $h = 2b$;

$$h = 2b, \frac{H_r}{H_a} = .00188 \quad (10)$$

Equation 8 assumes the radii $a$ of the wires are small compared with the spacing $b$ and further assumes a reflecting system having an infinite size and composed of an infinite number of equispaced infinitely long wires parallel to the plane of incidence. From this equation it will be seen that if the reflecting system is placed at a distance above the earth's surface equal to or greater than the spacing between adjacent wires, the earth's surface will be located in a relatively weak reactive field and its effect on the field above the artificial ground will be, regardless of the character of the earth's surface, only through that part of the incident plane wave which was transmitted across the artificial ground. Therefore, no substantial improvement will result in further increase of the height $h$ of the artificial ground above the actual ground. When the elevation is twice the spacing, the reactive field in the neighborhood of the earth's surface due to the spacing of the wires is approximately ⅛ of 1 per cent of the average reactive field at the surface of the artificial ground.

Aside from the above theoretical considerations it has been found by experiment that the spacing $b$ and the height $h$ are important factors governing the operation of the reflecting systems. In a test of one practical embodiment during which waves having a wave-length of 14.5 meters approximately and a wave-arrival angle of 1.75 degrees were received, changing the spacing $b$ from one yard $$\left(\frac{\lambda}{15}\right)$$

to one foot $$\left(\frac{\lambda}{45}\right)$$

and increasing the number of conductors from 35 to 105 produced a gain of two decibels. Changing the height from $h=0$ to $h=8$ feet produced a gain of three decibels. The dimensions L, W, F and B of the reflector tested were, respectively, 1,000 feet, 105 feet, 900 feet, and 100 feet.

Referring to Fig. 3 which is a curve plotted from data taken during a test of the 105 wire system described above, it will be seen that the reflecting system preferably extends in front of the antenna for a distance equal to 42 times the antenna height and, in any event, at least greater than the antenna height. This curve shows that the antenna output decreases as the antenna is moved from the preferred location along the reflecting system toward the cooperation station.

In operation, the reflector 5 functions, as previously indicated, to lower considerably the pseudo-Brewster angle for waves polarized parallel to, and propagated in the vertical plane XOZ containing the longitudinal reflector axis RR whereby low angle waves having, for example, a direction 11, Fig. 1, are efficiently transmitted or received in the above-mentioned vertical plane. More particularly, each wire functions to lower the pseudo-Brewster angle since the wire is in the plane of propagation and each wire and polarized component are in the same plane. Stated differently, the wire spacing, the height, the conductivity of the reflector and the location of the antenna with respect to the front edge of the reflector are such that the direct and reflected components of the low angle waves specified above are, assuming the system is used for reception, rendered in phase agreement at the antenna 1. While the system 5 favorably reflects wave components propagated in the above-mentioned vertical plane XOZ, it does not materially affect low angle waves propagated in other vertical planes intercepting the reflector. Hence, the system possesses a highly directional characteristic and its direction of maximum reflective action is included in the plane containing the longitudinal axis RR of the system. Reflection losses at the extremity of each wire 10 may be substantially eliminated by connecting one or more bond or transverse wires 12 to the longitudinal conductors and by connecting the far end extremity or both extremities of each longitudinal wire 10, and both extremities of each transverse wire 12 directly or through a terminating resistance 13 to ground. The bond wires may slightly decrease the directivity of the system.

Referring to Fig. 4 the curves illustrate the comparative antenna outputs actually obtained during a one-hour test period when receiving 14 meter waves from a distant transmitting station in New Jersey on four similar antennas using different reflecting surfaces, as follows: (1) a reflector or artificial ground system constructed in accordance with the invention and having 105 wires (not bonded and not terminated) placed 8 feet above the ground, the spacing being 1 foot and each wire being 1,000 feet long, as described above; (2) a salt-water site; (3) a marsh or swamp ground; and (4) ordinary dry ground.

During the one-hour period the wave arrival angle varied between 4.5 degrees and 7 degrees, approximately. Reference numerals 14, 15, 16 and 17 designate, respectively, the outputs obtained with the metallic artificial ground, salt-water ground, marsh ground and dry ground. It will be noted that the artificial ground produced an average gain over the ordinary dry ground of approximately 7.5 decibels and that the output obtained with the salt-water site, was lower than that secured with the artificial ground. In general, the gain of the metallic reflector over a reference ground increases as the wave arrival angle decreases.

In a different test in which locally transmitted waves having a wave-length of 14.5 meters and an arrival angle of 1.75 degrees were received, the reflecting system described above produced a 12-decibel gain over that obtained using ordinary ground and approached to within 6.5 decibels of the calculated gain for the ideal perfect ground. A perfect ground may be assumed to be a flat surface of infinite area, infinitesimal thickness and infinite conductivity. Other experiments showed that the transverse wires 12 employed to suppress reflection losses and standing waves increased the output of the antenna.

Although the invention has been described in connection with a particular embodiment, it should be understood that it is not to be limited to such embodiment inasmuch as other apparatus may be successfully employed in practising the invention. The reflector is intended for use with various types of antennas and arrays including multiunit arrays; and it may be employed with antenna systems positioned at a considerable height. Also, it is suitable for use with ultra-short wave, short wave, long wave, and broadcast antennas. The reflector of the invention, in a sense, replaces the earth's reflective surface and, therefore, is easily distinguishable from ground mats and ground conditioning systems heretofore utilized to improve the reflective and conductive properties of ordinary soil. Moreover, since the long parallel wires function to lower the pseudo-Brewster angle, the reflector is essentially different from elevated artificial ground systems of the prior art comprising short converging wires as, for example, the systems disclosed in Patent 706,746, R. A. Fessenden, August 12, 1902.

What is claimed is:

1. An artificial ground structure for use with an antenna and having a flat reflective surface, said structure comprising more than two parallel and equally spaced bare horizontal conductors elevated above the earth's surface a distance at least as great as the spacing between adjacent conductors, said reflector extending a plurality of wave-lengths in the desired direction of radiant action.

2. In combination, a vertically polarized antenna, a reflector-screen for changing the pseudo-Brewster angle of the wave direction comprising a plurality of parallel conductors positioned below said antenna and parallel to the earth's surface, the height of said reflector-screen being at least as great as the spacing between adjacent conductors.

3. In combination, an antenna, a horizontal reflector-screen comprising a plurality of parallel conductors positioned between said antenna and the earth's surface and means connected to said conductors for eliminating standing waves on said reflector-screen.

4. A reflector comprising a plurality of parallel conductors parallel to and above the earth's surface and means connected to said conductors for eliminating standing waves on said reflector, said means comprising conductors connected to said parallel conductors and positioned in the plane of said reflector perpendicular to said parallel conductors.

5. In combination, a vertical antenna, an artificial ground conducting system included between said antenna and the earth's surface and comprising at least two parallel conductors, the system being spaced from said antenna and the elevation of said conductors being at least as great as the spacing between said conductors.

6. In combination, a vertically polarized antenna, an artificial ground system for lowering the pseudo-Brewster wave direction angle positioned between said antenna and the earth's surface and comprising more than two parallel conductors of equal length included in a plane parallel to the earth's surface and in the desired vertical or incident plane of wave propagation, substantially, the elevation of said ground system being at least as great as the spacing between said conductors, the conductors each extending a plurality of wave-lengths in front of said antenna.

7. In combination, an antenna for utilizing waves polarized in the desired vertical plane of wave propagation and having a given height, a plane conductive system positioned between said antenna and the earth's surface and comprising a plurality of parallel equally spaced bare conductors, said system extending a distance including a multiple of said height on each side of said antenna in a direction perpendicular to said vertical plane and extending in a direction included in said plane a distance including a greater multiple of said height and the spacing between adjacent conductors being less than the height of said system.

8. In combination, an antenna for utilizing waves polarized in the incident plane of desired wave propagation, the apex of said antenna being a given height above the earth's surface, a plane conductive system comprising a plurality of parallel equally spaced bare conductors positioned between said antenna and said surface and parallel to said surface, said system extending in front and on both sides of said antenna a distance including a multiple greater than two of said height and the spacing between adjacent conductors being less than the height of said system.

9. In combination, a vertical antenna, an artificial horizontal ground system spaced from said antenna and comprising parallel conductors spaced a foot apart, said system being positioned between said antenna and the earth's surface and at least two feet above said surface whereby a relatively low pseudo-Brewster angle is obtained.

SERGEI A. SCHELKUNOFF.
WILLIAM M. SHARPLESS.